Feb. 26, 1935.　　　A. P. REDDEN　　　1,992,838
FRUIT GRADER
Filed July 3, 1933　　　2 Sheets-Sheet 1
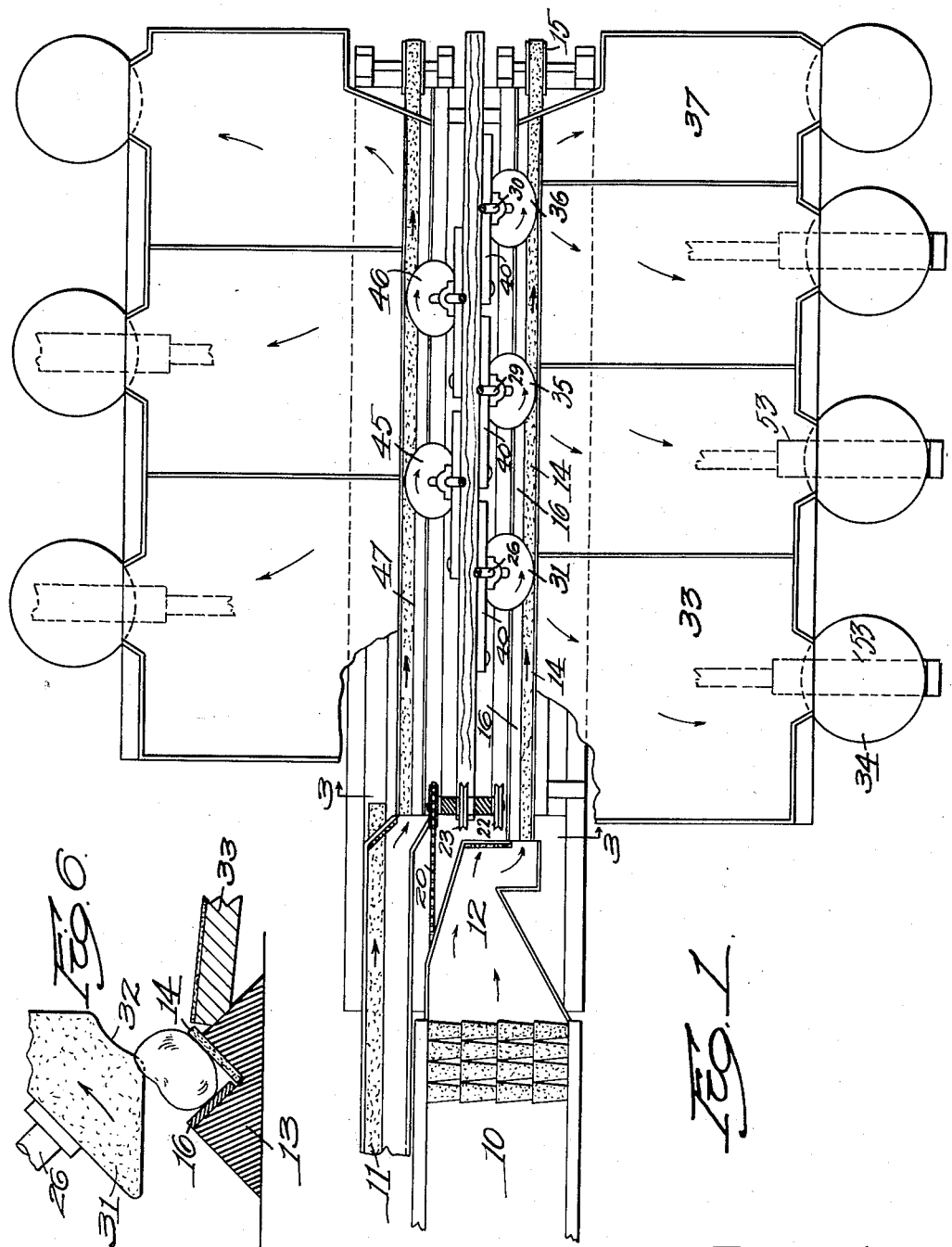

Feb. 26, 1935.  A. P. REDDEN  1,992,838
FRUIT GRADER
Filed July 3, 1933   2 Sheets-Sheet 2
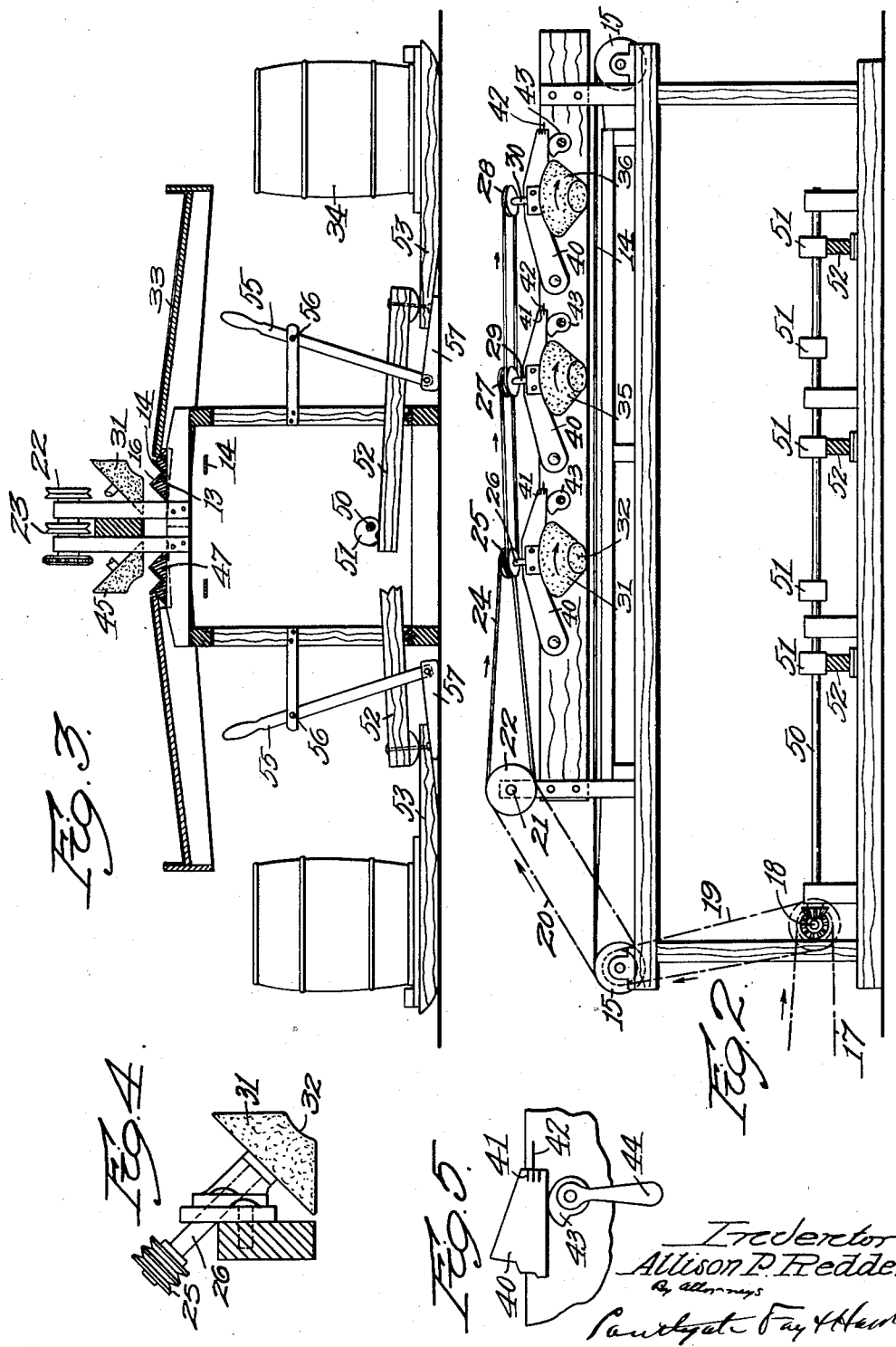

Patented Feb. 26, 1935

1,992,838

UNITED STATES PATENT OFFICE 1,992,838

FRUIT GRADER

Allison P. Redden, Kentville, Nova Scotia, Canada

Application July 3, 1933, Serial No. 678,901
In Canada January 26, 1933

5 Claims. (Cl. 209—91)

This invention relates to a machine for grading apples and other fruit.

The principal objects of the invention are to provide means for throwing fruit out of a trough having a moving side so that the fruit of different sizes will be discharged into different containers and to provide this means in a form in which it will not injure the fruit and will sort the fruit accurately and also to provide means for adjusting the several grading devices independently of each other to control the size of the fruit discharged.

Other objects and advantages of the invention will appear hereinafter.

Reference is to be had to the accompanying drawings, in which

Fig. 1 is a plan of a grading machine constructed in accordance with this invention;

Fig. 2 is a side elevation;

Fig. 3 is a transverse sectional view on the line 3—3 of Fig. 1;

Fig. 4 is a view of one of the grading devices as shown in Fig. 3 but on enlarged scale;

Fig. 5 is a side view of one of the adjusting devices as shown in Fig. 2 but on enlarged scale, and Fig. 6 is a transverse sectional view on the same line as Fig. 3, showing the action on the fruit of one of the grading devices.

Many grading devices have been developed which act more or less successfully but they are apt to bruise the fruit if they operate effectively otherwise and also, in some cases, the fruit is apt to become jammed in them thus stopping the further operation of the machine.

By the present invention the fruit cannot be injured or caught in the machine so as to stop it and the grading devices act effectively and accurately at all times.

The invention is shown as applied to a machine comprising an inspecting table 10 over which the fruit is carried and from which damaged fruit is taken and placed on a conveyor 11. The fruit that is not taken off is delivered through a chute 12 to the grading machine, which is the subject of this invention.

This grading machine comprises two longitudinal ways 13 having an angular groove between them, one side of which is formed of a belt 14 adapted to travel over pulleys 15, the other side of which is made up of a stationary smooth surface 16. As one side of this trough travels, the fruit will roll along it toward the discharge end of the machine.

The power is shown as applied through a belt 17, operating a transverse shaft 18 having a pulley which, through belts or chains 19 and 20, operates another transverse shaft 21. This shaft is provided with two pulleys 22 and 23. These pulleys 22 and 23, through belts or chains 24, drive a pair of pulleys 25, which in turn drive inclined shafts 26. The pulley 25 has a second groove in it driving another pulley 27 and in some cases a third pulley 28, these pulleys being fixed to shafts 29 and 30 respectively. The shafts 26, 29 and 30 are all inclined at 45° from the horizontal as shown, and are supported by the framework of the machine. They are offset about 45° from the vertical to the right at the bottom, as shown in Fig. 2, leaving the intake side the low side. On each of these shafts is a conical wheel 31 covered with soft rubber or any other convenient soft surface. The apex of the cone, which is located at the bottom, is cut away to leave a concave surface 32 constituting a quick release for the fruit. This wheel is located over the trough formed by the two members 14 and 16, one of which, it will be remembered, moves in the direction of the arrow.

From inspection of Fig. 6 it will be seen that the angle of the shaft 26 is so located that the wheel 31 rotates with one side or one element horizontal and it is located directly over the trough. When an apple or other fruit comes into a place under this wheel 31, if it is too small, it will pass along under it and, if it is large enough, it will engage the conical side of the wheel and the wheel, rotating in the direction of the arrow, rolls the apple on its axis and rolls it out of the trough in which it is shown in Fig. 6 and onto an inclined chute 33. The apple goes down this chute and is discharged into a barrel or other container 34. The reason for tilting the axis of the cone is to ensure that the intake side be lower than the output, so that, if an apple can get into it, it also can get out without being pinched or bruised.

It will be seen that the apples or other fruit that pass below the wheel 31 will come into contact or pass under other wheels 35 and 36 located further along the trough. The apples, therefore, will be sorted in the several chutes and those that pass under all the wheels will be delivered into the end chute 37 and into a barrel to which that delivers.

For the purpose of adjusting the several wheels 31, 35 and 36 the shafts on which they are mounted are carried by pivoted supports 40. Each support is provided with graduations 41 at the end and a zero point 42 is mounted on the frame of the machine. At the free end of each of these supports is a cam 43 under it adapted to be operated by a handle 44, each support being operated and adjusted individually. These adjustments can be made with any degree of fineness and the size of the apples thrown into each of the chutes is controlled thereby.

A couple of wheels 45 and 46 are shown similar to the wheels 31, 35 and 36 over a groove 47 to which the apples from the conveyor 11 are delivered.

The operation, of course, is the same on this so-called domestic fruit as it is the first class fruit.

The shaft 18 is shown as supplied with a gear which drives a longitudinal shaft 50. On this shaft are several cams 51 which operate levers 52 and thereby vibrate stands 53 on which the barrels 34 are located. Adjacent to each of these stands is a lever 55 pivoted at 56 and operating a wedge 57 which moves under an inclined portion on the bottom of one of the stands 53. When this wedge is pushed under the lever 52 is pushed up at that end and the other end pushed out of contact with the cam 51 and the vibration is stopped whenever it is desired to replace the barrels or for any other purpose.

It will be understood that the conical wheels shown can be used in any desired place for throwing apples above any specified size out of the trough for the purpose of grading the apples as to size. They do not injure the apples by crushing them or by having a wooden or any other hard part in a place in which it is possible to bruise the apples. They take an apple going in one direction and roll it over an inclined surface into a chute without any possibility of delivering a blow to it of any kind. They are readily adjustable to provide for different sizes and they can be multiplied in any desired way to provide for any desired number of grades of fruit.

Although I have illustrated and described only one form of the invention I am aware of the fact that modifications can be made therein by any person skilled in the art without departing from the scope of the invention as expressed in the claims. Therefore, I do not wish to be limited in this respect otherwise than as set forth in the claims, but what I claim is:—

1. In a fruit grading device, the combination of a trough along which the fruit is adapted to pass, of a conical wheel on an inclined axis transverse to the length of the trough having a soft surface located directly over the center of the trough and rotating for the purpose of rolling out of the trough the fruit which comes into contact with the wheel and allowing the small fruit to pass under the wheel.

2. In a fruit grading device, the combination of a trough and a wheel of a general conical shape located over the trough with its axis inclined to bring the lower elements of the cone into a substantially horizontal location, for the purpose described.

3. In a fruit grading device, the combination with a trough for receiving the fruit and a wheel on an axis inclined relatively to the plane of the trough located over the trough, the lower active side of which is substantially horizontal, the trough having converging sides, said wheel having a transverse surface to truncate the small end thereof, for the purpose described.

4. In a fruit grading device, the combination of a horizontal trough, in one side of which is a belt moving along the trough for rolling the fruit along the trough in the direction in which the belt travels and a conical wheel rotatable on an inclined axis in such a position so that the element of the cone on its lower side is substantially horizontal over the trough and adapted to engage the fruit projecting above the bottom of the wheel for the purpose of rolling the fruit out of the trough.

5. A fruit grader having means for rolling the fruit along in a certain direction, and means for directing the fruit to roll transversely comprising a conical wheel having a soft surface, and having its axis inclined and located transverse to the direction in which the fruit rolls before it engages the wheel and the lower element of the cone substantially parallel with the direction of the course of the fruit.

ALLISON P. REDDEN.